E. TEETER.
GEARING.
APPLICATION FILED JUNE 29, 1911.
1,045,215.
Patented Nov. 26, 1912.
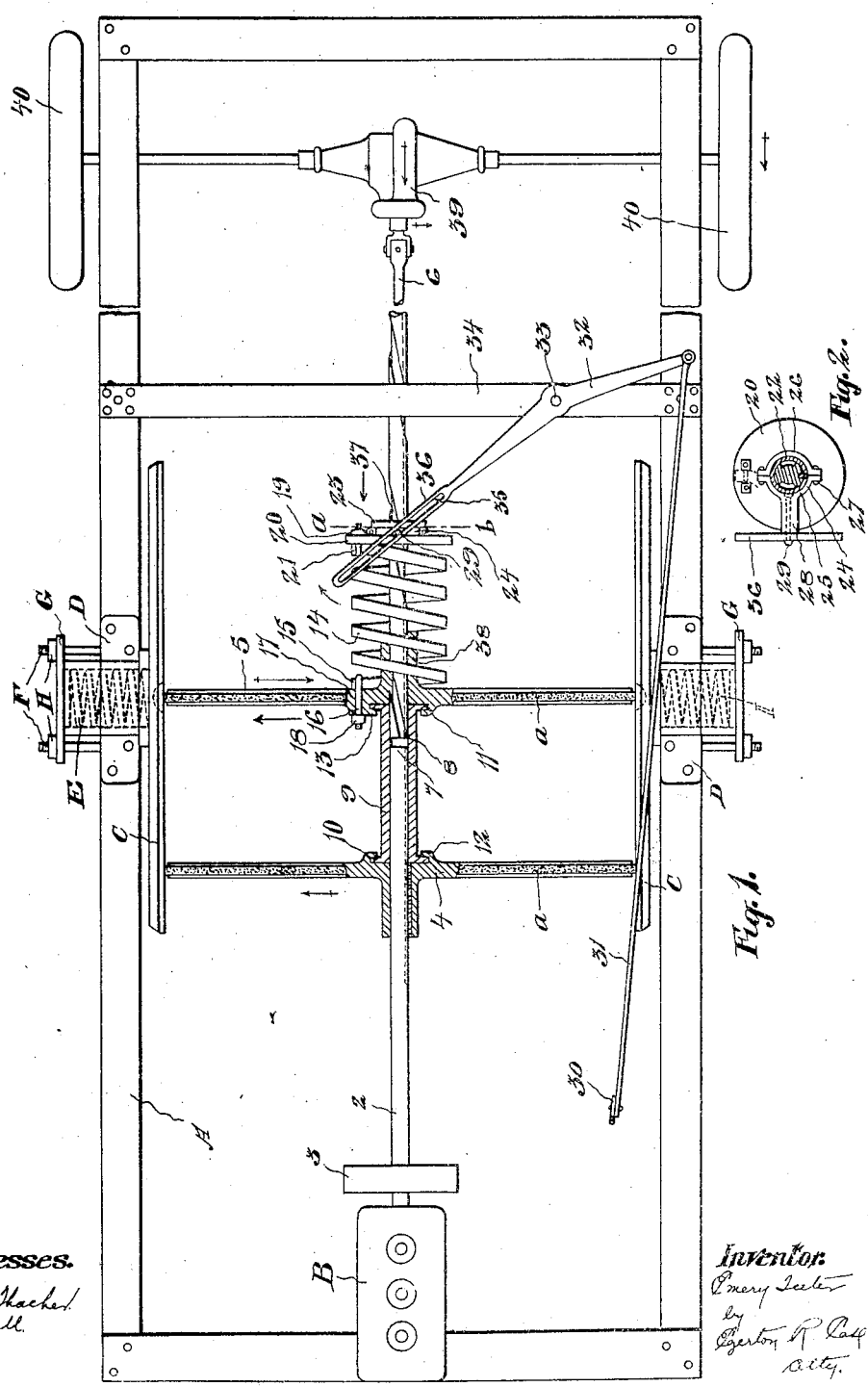

UNITED STATES PATENT OFFICE.

EMERY TEETER, OF HAMILTON, ONTARIO, CANADA.

GEARING.

1,045,215.
Specification of Letters Patent.
Patented Nov. 26, 1912.

Application filed June 29, 1911. Serial No. 636,035.

*To all whom it may concern:*

Be it known that I, EMERY TEETER, a subject of the King of Great Britain, residing at the city of Hamilton, Province of Ontario, in the county of Wentworth, Canada, have invented certain new and useful Improvements in Gearing, of which the following is a specification.

My invention relates to improvements in a combined automatic speed-regulator, brake and transmission-gearing, more particularly designed to be used in driving self-propelling vehicles, though, in its broad conception, I do not confine myself to using my invention necessarily in connection with the said class of vehicles, because it can be used in connection with various kinds of machines, and the principal object of my invention in the embodiment thereof disclosed, is to dispense with the transmission-gearing and brake-mechanism generally used in self-propelling vehicles, and to replace the same by automatic means which will vary the power of the torque or purchase of the mechanism in accordance with the resistance encountered; that is, if the power of the torque developed is not sufficient to overcome a certain road resistance, or, in other words, the resistance encountered by the power-consuming shaft in doing work, then the strength thereof is automatically increased, thus resulting in a decrease in the speed of the car, or power-consuming shaft, and, conversely, where the torque is excessive for a light road resistance, or the resistance encountered by the power-consuming shaft in doing work, the power thereof is automatically decreased, thus resulting in an increase in speed of the car or the power-consuming shaft; and the device broadly consists of a power-transmitting shaft driven by a motor, and a power-consuming shaft the longitudinal axis of which is in alinement with the longitudinal axis of the first-mentioned shaft, a pair of lateral friction disks with which is constantly in co-action a friction-disk splined on said power-transmitting shaft, a friction-disk mounted on said power-consuming shaft and held in constant relationship to the disk splined on said power-transmitting shaft, and means mounted on the said power-consuming shaft, and co-acting with the disks mounted on the said shafts whereby the torque or purchase of the mechanism is varied in accordance with the resistance encountered, as hereinafter more particularly explained.

Figure 1 is a plan view of the frame of a self-propelling vehicle, showing my invention combined therewith, certain of the parts being shown in section, and Fig. 2 is a cross section on the line $a$—$b$, Fig. 1.

In the drawings, like characters of reference indicate corresponding parts in each figure.

In this invention it must be understood at the outset that when the vehicle or machine is in use, although it may be temporarily at rest, the motor is always running at full speed and developing full power, and that the speed of the friction disk mounted on the power-consuming shaft is automatically varied according to the resistance met with, consequently the load on the motor is kept practically constant.

A is any suitable frame for the vehicle carrying the motor B.

C are a pair of friction-disks mounted one at each side of the frame A and with their axes of rotation in alinement. These disks are mounted after any suitable manner in bearings D carried by the frame A.

According to the construction illustrated, each disk C is provided with a hollow-hub E held in said bearings and projecting beyond the sides of the frame A.

F are a pair of threaded bars carried by the frame A on which is held a cap G which closes the outer end of each hub E. The nuts H on the bars F keep the caps G in place. Mounted within each hub E is a coiled spring, which is held under compression by its associated cap G so as to hold the friction disks C snugly against the disks, hereinafter mentioned, they co-act with. The parts just described I lay no claim to, as any suitable means may be used for mounting the friction-disks C in position.

2 is the shaft operated by the motor B, and 3 the fly-wheel carried by said shaft. Splined on the power-transmitting shaft 2 is a friction-disk 4 which is always in contact with the friction-disks C.

5 is a friction-disk rotatably mounted on the power-consuming shaft 6, the longitudinal axis of which is in alinement with the longitudinal axis of the shaft 2. The inner ends 7 and 8 of the shafts 2 and 6 extend into the sleeve 9; this sleeve 9 is provided at each end with out-turned flanges 10 and 11 which have bearing within the retainingflanges 12 and 13 formed respectively with the friction-disks 4 and 5. By means of the construction just described, the friction-disks 4 and 5 are always held a constant distance apart.

14 is a spring mounted to surround a portion of the length of the power-consuming shaft 6, and one end 15 of this spring is secured by any suitable means, (such as the U-shaped clamp 16 extending through the hub 17 of the friction disk 5) to said friction disk. Locking said clamp in position are nuts 18.

Splined on the power shaft 6 is a member 19 comprising a disk 20 to which the end 21 of the spring 14 is suitably secured, preferably by means of the same construction whereby the end 15 of the said spring is clamped in position. The disk 20 is provided with a hub 22 integrally provided with a collar 23 which is spaced apart from the disk 20 by means of the annular groove in which is clamped the two-part ring 24 comprising sections 25 and 26 which are bolted together at their ends by the nuts and bolts designated by the common numeral 27. The two-part ring 24 allows the disk 20 and its connected parts to freely rotate. Integrally formed with the section 25 is a post 28 through which passes a bolt 29 held therein.

As before described, the motor B, when the vehicle or machine is in use, is always operating at full speed and developing full power. In the position of the parts illustrated in the drawings, the friction disk 5 is positioned opposite the center of the friction disks C, and consequently the vehicle is at rest. In order to start the vehicle, the driver, by means of the lever 30 pivoted near his seat, and connected by the rod 31 with the bell-crank lever 32 (pivoted at 33 to the bearing-member 34 of the frame A) moves this bell-crank lever in the direction indicated by arrow, and as the bolt 29 operates in the slot 35 formed in the end 36 of this lever, the disk 20 and its connected parts are moved to the right on the power-consuming shaft 6. This shaft 6 is provided with a spiral-groove 37 with which engage threads formed in the hub 38, of the disk 5. The said spiral groove is so shaped that the said disk 5 may be readily shifted by the spring 14 to the right.

As a result of the described movement, the coils of the spring 14 pull the disk 5 to the right on the shaft 6, the desired distance, determined by the operator. Immediately the disk 5 comes into contact with the disks C, it starts to rotate, and in due course the spring 14 is twisted stiff enough to transmit energy to the shaft 6 which will operate the differential gearing 39 and drive the drive-wheels 40 mounted on their respective shafts. The spring 14 will not require much twisting to make it stiff enough to transmit energy to the shaft 6. As the disk 5 is tightening the spring 14, it must move more or less to the left on the shaft 6 so long as this shaft and the said disk are not rotating at the same speed, as is apparent to one skilled in the art.

As the friction disk 5 is moving to the right along the shaft 6 under the influence of the spring 14, the friction disk 4 is also moved to the right, and this friction disk 4 will cease to have longitudinal movement on the shaft 2 when the friction disk 5 ceases to have longitudinal movement on the shaft 6. It will be understood by one skilled in this art that the further the friction disk 4 is moved to the right, the faster will the friction disks C be revolved, and that the further the friction disk 5 is moved to the right, the faster will the same be revolved. The described longitudinal movments of the friction disks 4 and 5 on their respective shafts will be quite gradual, and consequently the shaft 6 will be turned slowly at first and so prevent any undue jarring. The farther to the right the operator moves the disk 19 along the shaft 6, the higher will be the speed obtained, as will be understood by one skilled in this art. Whenever the road resistance or the resistance encountered by the power-consuming shaft 6 in doing work is too great for the power developed by the torque, there naturally will be a lag in the power-consuming shaft 6 and the disk 20 splined thereon. Now, as a result of this lag, and by reason of the coaction between the threads of the hub 38 of the disk 5, and the spiral groove 37, the disks 5 and 4, coupled together by the connecting sleeve 9, will be moved to the left across each face of the disk C until the speed of the mechanism has been reduced and the power of the torque increased enough to overcome the resistance. To allow for this movement, the spring 14, must readily lengthen, as will be understood. When the mechanism is not in use, of course the spring 14 is not under any strain. It will of course be understood that by means of the lever 30 and its connected parts, the bell-crank lever 32 will prevent longitudinal movement of the disk 20 on the shaft 6. The friction disks 4 and 5 are preferably faced with leather "$a$" or other suitable material, so as to increase the friction between the same and the disks C.

In order to brake the vehicle, or cause the same to run backward, the bell-crank lever 32 is moved by the lever 30 and rod 31 in the direction opposite to that indicated by the arrow, and so moves the disk 5 to the left-hand side of the center of the disks C, thus getting a rotation of the disk 5 in the direction indicated by the plain arrow. It therefore follows that if the disk 5 be maintained in the position just described for a sufficient length of time, the vehicle will be driven backward.

While I have described what I consider to be the best embodiment of my invention, I desire it to be understood that the principles can be embodied in different forms, and I desire not to be limited beyond the requirements of the prior art and the terms of my claims.

What I claim as my invention is:—

1. The combination with a motor-driven shaft, of a power-consuming shaft to be driven therefrom, the longitudinal axis of which is in alinement with the longitudinal axis of said shaft; a friction-disk splined on said motor-driven shaft; a friction disk mounted on said power-consuming shaft; means whereby the distance between these disks is kept constant; a pair of friction-disks co-acting with the disks mounted on the said shafts; bearings for said pair of friction disks, and means combined with said power consuming shaft and connected with said friction-disk mounted on said power-consuming shaft and co-acting with the said pair of friction disks whereby the torque or purchase of the mechanism is automatically varied in accordance with the resistance encountered and so automatically regulating the speed at which said shaft is driven.

2. The combination with a motor-driven shaft, of a power-consuming shaft to be driven therefrom, the longitudinal axis of which is in alinement with the longitudinal axis of said motor-driven shaft; a friction disk splined on said motor-driven shaft; a friction disk mounted on said power-consuming shaft; means whereby the distance between the said disks is kept constant; a pair of friction disks co-acting with the disks mounted on the said shafts; bearings for said pair of friction disks; means combined with said power-consuming shaft and connected with said friction-disk mounted on said power-consuming shaft, and co-acting with the said pair of friction-disks, whereby the torque of the mechanism is automatically varied in accordance with the resistance encountered, and so automatically regulating the speed at which said power-consuming shaft is driven, and means for adjusting the position of said automatic means in order to get the desired speed.

3. The combination with a motor-driven shaft, of a power-consuming shaft to be driven therefrom, the longitudinal axis of which is in alinement with the longitudinal axis of said motor shaft; a friction disk splined on said motor-driven shaft; a friction disk mounted on said power-consuming shaft; a sleeve receiving the inner ends of said shafts associated with said friction disks in order to keep them a constant distance apart; a pair of friction-disks co-acting with the disks mounted on the said shaft; bearings for said pair of friction disks, and means combined with said power-consuming shaft and connected with said friction-disk thereon whereby the torque or purchase of the mechanism is automatically varied in accordance with the resistance encountered and so automatically regulating the speed at which said shaft is driven.

4. The combination with a motor-driven shaft, of a power-consuming shaft provided with spiral grooves extending to its inner end, the longitudinal axis of said power-consuming shaft being in alinement with the said motor-shaft; a friction disk splined on said motor-driven shaft; a friction disk mounted on said power-consuming shaft and designed to co-act with the spiral grooves thereof; a sleeve receiving the inner ends of said shafts associated with said friction disks in order to keep them a constant distance apart; a pair of friction disks co-acting with the disks mounted on the said shafts; a spring secured at one end to the friction disk mounted on said power-consuming shaft, and through which said shaft extends; a member splined on said power-consuming shaft to which the other end of said spring is secured, and means for adjusting the position of said member in respect of said power-consuming shaft and locking the same in adjusted position, the said spring and its connected parts co-acting with the friction disks whereby the torque or purchase of the mechanism is automatically varied in accordance with the resistance encountered and so automatically regulating the speed at which said power-driven shaft is operated.

In testimony whereof I have affixed my signature in presence of two witnesses.

EMERY TEETER.

Witnesses:
OSWALD D. PEAT,
A. W. LOVE.